Feb. 6, 1962

H. H. KOBRYNER ET AL
LOAD DISTRIBUTING ARRANGEMENT
FOR PULL-OUT TYPE SWITCHES 3,020,373

Filed June 10, 1959

INVENTORS
HERMAN H. KOBRYNER
AND
CHARLES F. BRAUNECK
BY

ATTORNEY

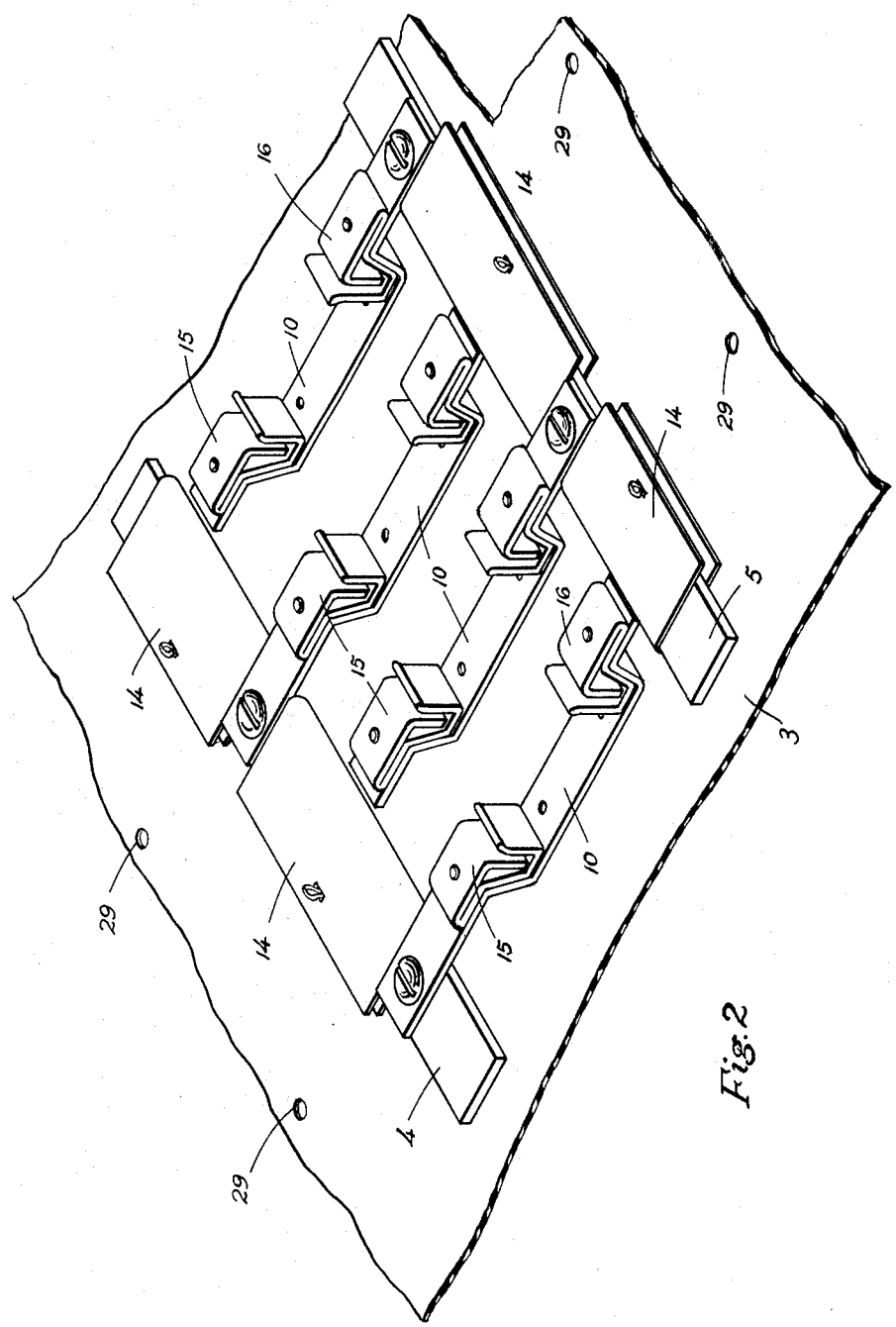

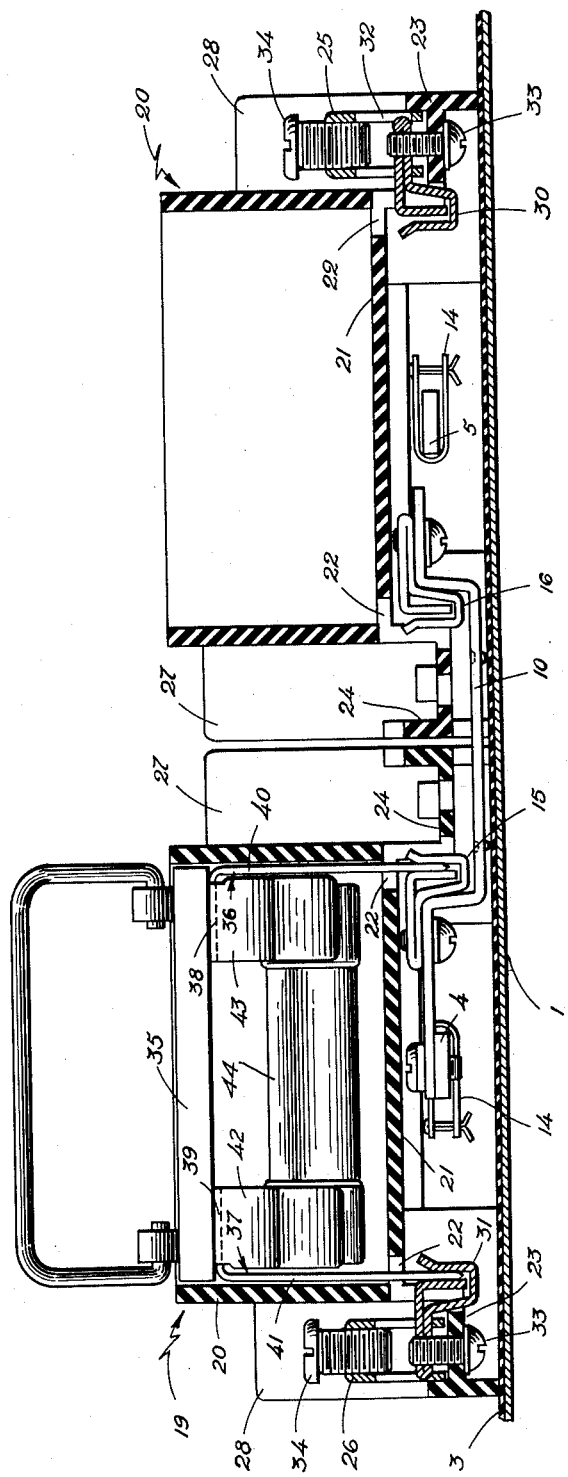

United States Patent Office 3,020,373
Patented Feb. 6, 1962

3,020,373
LOAD DISTRIBUTING ARRANGEMENT FOR PULL-OUT TYPE SWITCHES
Herman H. Kobryner, Forest Hills, and Charles F. Brauneck, Glen Cove, N.Y., assignors to Murray Manufacturing Corporation, Brooklyn, N.Y.
Filed June 10, 1959, Ser. No. 819,254
8 Claims. (Cl. 200—133)

This invention relates to a load distributing arrangement for pull-out type switches, and more particularly to a unique arrangement for ganging a plurality of such switches.

The pull-out switch is now well known. It comprises a base portion and a puller portion. The base portion is in the shape of an open rectangular box having at the bottom of the box contact clips for connection to "load" and "line" wiring terminals. The puller portion comprises a cover for the base and contact blades adapted to engage the clips in the base when the puller portion is fully seated on the base. The contact blades on the line side are electrically connected to the blades on the load side through fuses. For a detailed description of a pull-out switch, reference may be had to copending application Serial No. 629,547, filed December 20, 1956 and assigned to the Murray Manufacturing Corporation (Kobryner 2).

Conventionally, when two or more pull-out type switches are assembled or ganged together in parallel connections to a pair of line terminals, the means for making the connections are usually a variety of different size and oddly shaped bussing segments, straps and wire cables. The physical arrangement of such switches has been, therefore, wasteful of space in the enclosure and disorderly in appearance, and the load distributing center has been unwieldly, complicated to assemble, costly to manufacture, unnecessarily large in size and with little sales appeal.

Accordingly, it is a primary object of this invention to provide a simple and inexpensive bussing structure for ganging, in orderly arrangement, pull-out type switches of the conventional type.

It is a further object of the invention to eliminate the variety of straps, busses and wire cables and to substitute therefor a standard bus extension fitting.

Another object of the invention is to provide a compact, symmetrical and neat arrangement of the pull-out switches requiring a minimum of space in the enclosure.

A still further object of the invention is to provide a simple bussing structure which permits simple, easy and safe installation of additional pull-out switches in the field after the complete load distributing center has been installed, or which permits the initial installation of bus structure in the enclosure and the addition of all pull-out switches at a later time, thus greatly simplifying storage problems.

Another object of the invention is to accomplish the above-mentioned objects in a manner which reduces the customary number of contact points in the circuits, thereby minimizing the possibility of overheating in use due to poor contacts, loosened screws, etc. as compared with existing plug-in type systems.

A still further object of the invention is to provide a novel load distributing arrangement for pull-out switches, using existing parts, both molding and fittings, and requiring only a single new part.

In accordance with an aspect of the invention, there is provided a load distributing arrangement comprising a pair of bus bars spaced a given distance apart and secured in an enclosure. The invention is characterized by a plurality of conductive fittings extending alternately from opposite bus bars; each of the fittings includes a pair of spaced contact clips, and the clips on the plurality of fittings are aligned in the direction of the bus bars. The bussing structure is adapted to accommodate a plurality of pull-out switches, each comprising an insulated base portion in the shape of an open rectangular box having a raised bottom. The base portion is secured to the enclosure so that the raised bottom extends over a bus bar, and is of such width as to overlap adjacent fitting clips. A second pair of clips is provided on the base portion below the floor thereof, for connection to load circuits. The floor of the box is slotted to expose the adjacent fitting clips and the load side clips to the inside of the box. The switch also comprises a puller portion in the shape of a cover for the box which carries two pairs of contact blades positioned to enter the several clips through the slots in the floor of the box. The two pairs of blades are respectively electrically connected together through fuses, whereby a circuit extends from a bus bar, over a fitting clip, contact blade, fuse and load side clip to the load.

The above-mentioned and other features and objects of this invention and the manner of attaining them will become more apparent and the invention itself will be best understood by reference to the following description of an embodiment of the invention taken in conjunction with the accompanying drawing, wherein:

FIG. 2 is a partial perspective view of the bussing structure;

FIG. 4 is a cross-sectional view of the load distributing arrangement.

Figure 1:
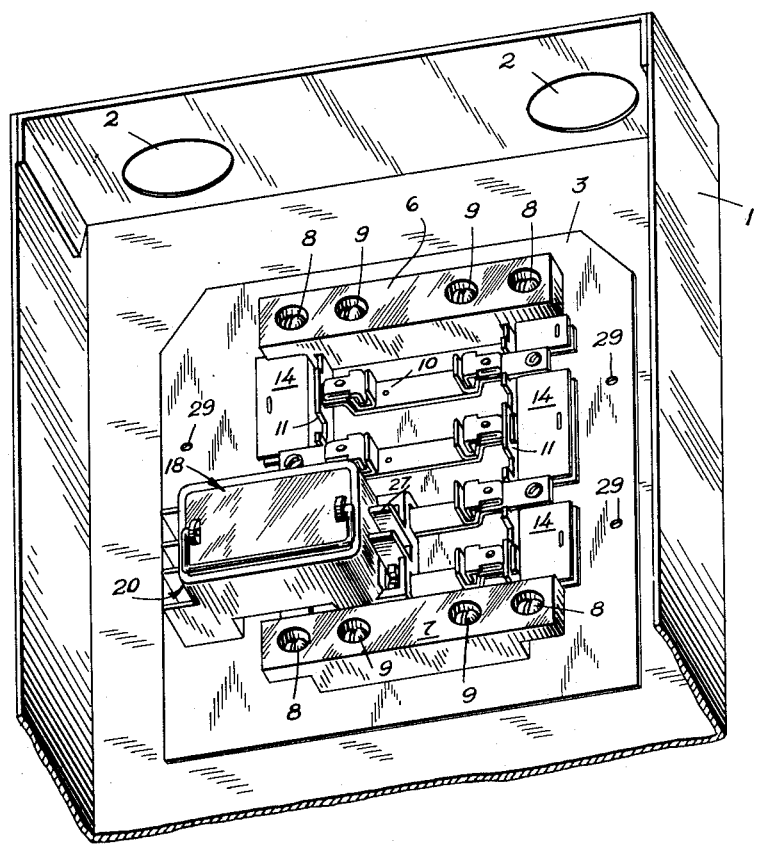
FIG. 1 is a perspective view of the novel load distributing arrangement, showing one pull-out switch in position.

Referring first to FIG. 1, there is illustrated a load distributing arrangement comprising an enclosure 1 for the bussing structure and pull-out switches. The enclosure is the conventional mounting box having knock-outs 2 for accommodating electrical cable.

A sheet of insulating material 3 is secured to the base of the enclosure and the bussing structure is mounted on the insulating sheet. The bussing structure, as best seen in FIG. 2, comprises a pair of bus bars 4, 5 supported in fixed spaced relation by a pair of insulating mounting blocks 6, 7 (FIG. 1). The mounting blocks are cutaway at the opposite ends a distance approximately equal to the width of the bus bars, and the bus bars are secured to the ends of the blocks by screws 8, in a flat position relative to the base of the enclosure. The blocks are fastened to the enclosure by screws 9.

Figure 3:
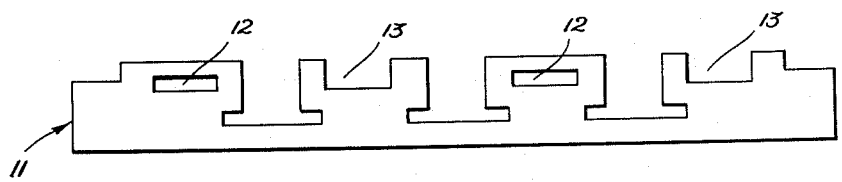
FIG. 3 is a side view of an insulating strip used to support one end of each of the fittings shown in FIGS. 1 and 2.

The invention is characterized by providing a plurality of evenly-spaced fittings 10 extending alternately from opposite bus bars 4, 5. Each of the fittings is in the shape of a flat, elongated bar having a depressed portion between the opposite ends thereof. One end of each of the fittings is screwed to a bus bar, as shown, and the opposite ends of the fittings terminate short of the opposite bus bar. Thus, in effect, one end of each fitting is rigidly secured and the opposite end is relatively free. In order to restrain the free end against movement, a pair of insulated fiber strips 11 (FIGS. 1 and 3) are provided. The strips are shaped with alternate slots 12 and U-shaped openings 13 along the length thereof. The longitudinal ends of the strips 11 are dimensioned to fit tightly into correspondingly shaped slots in each of the mounting blocks 6, 7, as best seen in FIG. 1, for vertical mounting. The free end of each fitting 10 is thus fitted into a slot 12 of the one strip and the secured end of the fitting rests in an aligned U-shaped opening 13 of the opposite strip.

Fiber insulator covers 14 are provided around sections of the bus bars between the fittings 10, as shown.

Each of the fittings 10 also includes a pair of spaced contact clips 15 and 16. Each clip is generally in the shape of a U and includes an arm for mounting the clip to the fitting. The mounting arm is formed by an end of the U being bent away from the U a given distance, then folded back on itself and re-entering the U to form a pair of jaws with the other leg of the U. The clips 15, 16 are mounted to the fitting 10 so that the U-shaped part is adjacent the depending walls of the fitting. The arms of the clips are secured to the adjacent unrecessed portions of the fitting by any suitable means. Since all of the fittings are shaped similarly, the clips 15, 16, by being mounted adjacent the depending walls, are aligned in the direction of the bus bars.

The novel bussing structure is adapted to accommodate a plurality of pull-out type switches, one of which is shown at 18 in FIG. 1 and 19 in FIG. 4. The pull-out switch comprises an insulated base portion 20, which is in the shape of an open rectangular box (shown specifically on the right side of FIG. 4), having a raised floor portion 21 extending laterally of the box. The floor portion 21, at the four corners thereof, is slotted, the slots 22 extending from the side walls a given distance along the end walls. At the opposite ends of the box, platforms 23, 24 are provided, preferably molded as an integral part of the box.

In the conventional base portion, a pair of wiring terminals are mounted on each of the platforms. The two terminals at one end of the base are connected to the line and the two terminals at the opposite end are connected to the load. In accordance with the invention, the line side terminals are omitted from the base, the connection now being made directly to the bus bars over the fitting clips, as will be explained more fully hereinafter.

The load side wiring terminals, however, are retained and one of each pair is shown in FIG. 4, at 25 and 26.

The platforms are divided into terminal supporting sections by partitions 27, 28, arranged in pairs and extending across the respective platforms. The space between partitions of a pair is sufficient to accommodate a screw which passes through the platform and engages tapped holes 29 in the enclosure base, whereby the switch base is secured to the enclosure. The partitions 27, 28 act as an insulating barrier between the screw and the adjacent wire terminals 25, 26. If desired, a retaining strap (not shown) may be provided over the switches for additional support. However, such strap has been found unnecessary in the novel mounting.

The line side partitions 27 serve no useful purpose in this invention, since the line terminals are removed. However, one of the advantages of the invention is the compatibility of existing equipment in the novel over-all assembly. The conventional base portion, therefore, has been illustrated which includes both front and rear partitions.

Referring again for a moment to the bussing structure, the spacing between adjacent fittings 10 has been selected so that it corresponds to the spacing between clips in the conventional switch base; that is below the slots in the floor 21.

The base portion is positioned so that the raised floor portion 21 extends over the bus bar, and so that the forward slots 22 overlie the fitting clips.

Load side clips 30, 31, similar in construction to the fitting clips 15, 16, form part of the base portion of the switch and underlie the rear slots in the floor. The clips 30, 31 are electrically connected to the wiring terminals by means of an interlocking mechanical connection. The wiring terminal comprises a yoke 32 in the shape of an inverted U. The lower edges of the opposite legs of the U are slotted to accommodate the mounting arm of the clip. The wiring terminal-clip assembly is secured to the platform by a screw 33 passing through the platform and engaging a tapped hole in the mounting arm. A terminal screw 34 is provided in the bridge of the U for maintaining wire laid in the yoke.

The puller portion of the switch is conventional, no changes having been necessitated by the invention. The puller portion carries the mechanism for connecting the line to the load over a protective device such as a fuse.

As best seen in FIG. 4, the puller portion comprises a cover 35 for the base of the pull-out switch. The cover is also molded and made of the same insulating material as the base. Two pairs of angle-shaped contact blades 36, 37 are attached, e.g., by screws, to the under side of the cover. One leg 38, 39 of each blade is directly attached to the cover and the other leg 40, 41 extends perpendicularly away from the plane of the cover. The blades are positioned so that the legs 40, 41 pass through the slots in the floor of the base into the respective clips. Only one pair of blades is shown in FIG. 4, the other pair being located directly behind the shown pair, in the sense of the sectional view, is concealed.

A fuse clip 42, 43 is connected to each of the blades at the secured leg 38, 39, or is preferably formed integral therewith, and carries one end of a fuse 44. The fuse extends from a blade connecting a fitting clip to an aligned load side clip.

It should now be apparent that a pull-out switch carrying two fuses is capable of controlling two circuits since adjacent fittings are connected to the opposite bus bars. Further, if the bus bars are carrying voltages of opposite polarity (240 volts between lines) the single switch being connected to adjacent fittings can protect the two pole circuit.

There has now been described a novel load distributing arrangement for pull-out switches utilizing conventional bus bars, fittings, clips and pull-out switches. One highly desirable feature of the invention in comparison with the existing plug-in systems is the reduction of the amount of blade and jaw type contacts, which usually are a source of heat.

While the foregoing description sets forth the principles of the invention in connection with specific apparatus, it is to be clearly understood that this description is made only by way of example and not as a limitation of the scope of the invention as set forth in the objects thereof and in the accompanying claims.

What we claim is:

1. A load distributing arrangement comprising an enclosure, a pair of bus bars spaced a predetermined distance apart, means securing said bus bars in insulating relation to the base of said enclosure, a plurality of conductive fittings extending alternately from opposite of said bus bars, each of said fittings including a pair of spaced contact clips, the clips on the plurality of fittings being aligned in the direction of the bus bars; a plurality of pull-out type switches, each comprising an insulated base portion in the shape of an open rectangular box having a raised bottom, means securing said base portion to said enclosure so that the raised bottom thereof extends over a bus bar, the box being of sufficient width to overlap adjacent of said fittings and including openings at one end of the bottom thereof for exposing said adjacent fittings to the inside of said box, a second pair of contact clips mounted at the opposite end of the bottom of said box, said switch further comprising a puller portion in the shape of a cover for said box, two pairs of contact blades attached to said cover and positioned to enter said fitting clips through the openings in said box and said contact clips respectively, and fuses electrically connecting the blades at one end of said box to the blades at the opposite end of the box.

2. The load distributing arrangement according to claim 1, wherein said bus bar securing means comprises a pair of insulating mounting blocks recessed for accommodating said bus bars side-by-side and in a flat position relative to the base of said enclosure.

3. The load distributing arrangement according to claim 2, wherein each of said fittings is in the shape of a flat elongated bar, one end of said flat bar being secured to one of said bus bars and the other end thereof terminating short of the opposite bus bar, a pair of insulator strips extending between said mounting blocks and secured thereto, each of said strips including slots for accommodating and restraining said other ends of said flat bars against movement.

4. The load distributing arrangement according to claim 3, wherein each of said contact clips is generally in the shape of a U including a mounting arm extending from one leg thereof, the mounting arm being formed by an end of the U being bent away from the U a given distance, folded back on itself and re-entering the U to form a pair of jaws with the other leg of the U, whereby the contact blades engage the clips by extending between said jaws.

5. The load distributing arrangement according to claim 4, wherein each of said flat elongated fitting bars has a recessed portion between the opposite ends thereof, and means mounting said fitting clips to said flat bars so that the U-shaped portions are adjacent the recessing walls and the respective mounting arms are secured to the adjacent unrecessed portions of the flat bars.

6. A load distributing arrangement, comprising an enclosure, a pair of bus bars, a pair of insulated mounting blocks for securing said bus bars side-by-side in spaced relation and in a flat position relative to the base of said enclosure, means for mounting said blocks to the base of said enclosure, a plurality of conductive fittings extending alternately from opposite of said bus bars, each of said fittings being in the shape of a flat elongated bar having a recessed portion between the opposite ends thereof, means mounting one end of said flat bar on one of said bus bars, the opposite end thereof terminating short of the opposite bus bar, each of said fittings also including a pair of spaced contact clips, each clip generally being in the shape of a U having a pair of switch jaws, means mounting said clips to said flat bars so that a leg of the U is adjacent the recessing walls, whereby the clips are aligned in the direction of said bus bars; a plurality of pull-out type switches, each comprising an insulated base portion in the shape of an open rectangular box having a raised bottom extending laterally thereof, means securing said base portion to said enclosure so that the raised bottom thereof extends over a bus bar, the box being of sufficient width to overlap adjacent of said fitting bars and including openings at one end of the bottom thereof for exposing adjacent fitting clips to the inside of said box, a second pair of contact clips mounted at the opposite end of the bottom of said box, said switch further comprising a puller portion in the shape of a cover for said box, two pairs of contact blades attached to said cover and positioned to enter said contact clips and said fitting clips through the openings in said box, and fuses electrically connecting the blades at one end of said box to the blades at the opposite end of the box.

7. The load distributing arrangement, according to claim 6, and further comprising a pair of insulator strips extending between said mounting blocks and secured thereto, and each strip including slots for accommodating and restraining said opposite ends of said flat bars against movement.

8. A load distributing arrangement, comprising an enclosure, a pair of bus bars, a pair of insulated mounting blocks for said bus bars, said blocks being recessed for accommodating said bus bars side-by-side in spaced relation and in a flat position relative to the base of said enclosure, means for rigidly securing said bus bars to said blocks and means for mounting said blocks to the base of said enclosure, a plurality of conductive fittings extending alternately from opposite of said bus bars, each of said fittings being in the shape of a flat elongated bar having a depressed portion between the opposite ends thereof, means mounting one end of said flat bar on one of said bus bars, the opposite end thereof terminating short of the opposite bus bar, a pair of insulator strips extending between said mounting blocks and secured thereto, each including slots for accommodating and restraining said opposite ends of said flat bars against movement, each of said fittings also including a pair of spaced contact clips, each clip being generally in the shape of a U having a mounting arm extending from one leg thereof, the mounting arm being formed by an end of the U being bent away from the U a given distance, folded back on itself and re-entering the U to form a pair of jaws with the other leg of the U, means mounting said clips to said flat bars so that the U-shaped part is adjacent the recessing walls and the respective arms thereof are secured to the adjacent unrecessed portions of said flat bars, whereby the clips are aligned in the direction of said bus bars; a plurality of pull-out type switches, each comprising an insulated base portion in the shape of an open rectangular box having a raised bottom extending laterally thereof, means securing said base portion to said enclosure so that the raised bottom thereof extends over a bus bar, the box being of sufficient width to overlap adjacent of said fitting bars and including openings at one end of the bottom thereof for exposing adjacent fitting clips to the inside of said box, a second pair of contact clips mounted at the opposite end of the bottom of said box, said switch further comprising a puller portion in the shape of a cover for said box, two pairs of contact blades attached to said cover and positioned to enter said contact clips and said fitting clips through the openings in said box, and fuses electrically connecting the blades at one end of said box to the blades at the opposite end of the box.

References Cited in the file of this patent

UNITED STATES PATENTS

| | | |
|---|---|---|
| 1,974,452 | Frank | Sept. 25, 1934 |
| 1,981,929 | Starrett | Nov. 27, 1934 |
| 2,074,861 | Sachs | Mar. 23, 1937 |
| 2,831,088 | Kobryner | Apr. 15, 1958 |
| 2,899,521 | Salomone | Aug. 11, 1959 |
| 2,907,849 | Kobryner | Oct. 6, 1959 |
| 2,961,512 | Stanback et al. | Nov. 22, 1960 |